United States Patent
John

[15] 3,675,784
[45] July 11, 1972

[54] ONE STEP LOCK AND RELEASE CYCLE STAND

[72] Inventor: Ansel N. John, 2770 Joel Court, Dayton, Ohio 45439

[22] Filed: June 26, 1970

[21] Appl. No.: 50,130

[52] U.S. Cl. ............................................................ 211/22
[51] Int. Cl. ....................................................... A47f 7/00
[58] Field of Search .............................. 211/20, 21, 22, 23

[56] References Cited

UNITED STATES PATENTS

| | | | |
|---|---|---|---|
| 503,185 | 8/1893 | Wood | 211/22 |
| 542,964 | 7/1895 | Le Fevre | 211/22 |
| 577,910 | 3/1897 | Bierbach | 211/22 |
| 598,040 | 1/1898 | Webster | 211/22 |
| 605,429 | 6/1898 | Howard | 211/22 |
| 623,785 | 4/1899 | Hubbell | 211/22 |
| 653,519 | 7/1900 | Masters | 211/22 |

*Primary Examiner*—Nile C. Byers, Jr.
*Attorney*—Gustalo Nunez

[57] ABSTRACT

A simplified one step lock and release cycle support stand which includes an adjustable support, an extending support and a moveably operated pressure arm. The bottom bracket and the down tube of a cycle are placed on the adjustable and extending support respectively. The cycle is locked in place by operating the pressure arm to apply pressure in the cycle frame thus retaining the cycle on the stand.

5 Claims, 5 Drawing Figures

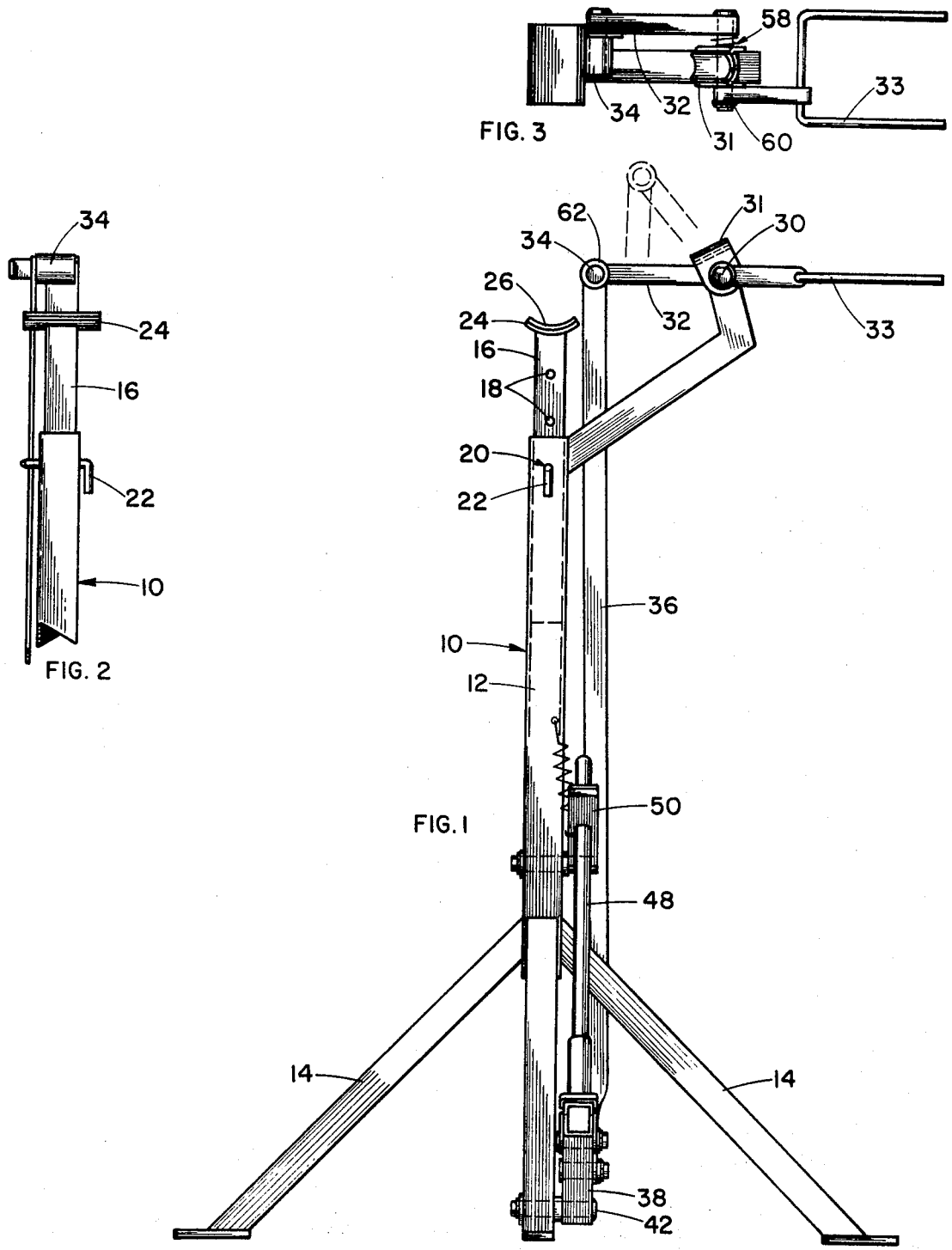

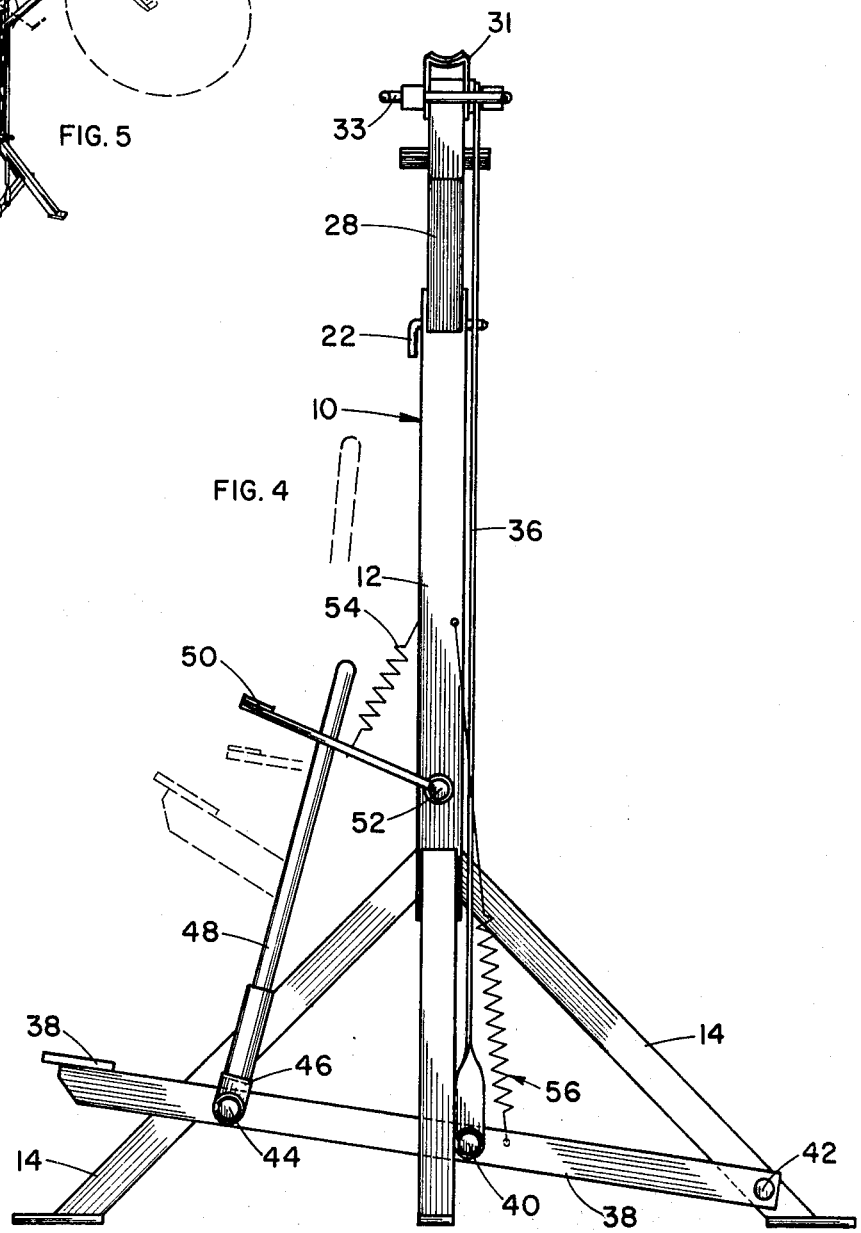

ONE STEP LOCK AND RELEASE CYCLE STAND

BACKGROUND OF THE INVENTION

1. Field of the Invention

This invention relates in general to a support stand used primarily by mechanics for maintaining cycles, bicycles and tricycles in an elevated position.

2. Description of the Prior Art

Support stands for bicycles, tricycles and cycles are well known, e.g., as illustrated in U.S. Pat. Nos. 623,785 and 1,560,892. However, none involve a support stand which is capable of one step operation, i.e., one step to lock the bicycle on the stand or one step to release the bicycle. The prior art does not disclose a support stand capable of being used with bicycles, tricycles or cycles of varying shapes and configurations with any degree of simplicity, such as is found in the present invention. The present invention need not be bolted down for the successful operation thereof although it may be if desired.

SUMMARY OF THE INVENTION

The present invention relates to a support stand capable of sustaining bicycles, tricycles and cycles of most any known configuration in an elevated position for purposes of performing maintenance, demonstrations or setting up. Throughout this specification, the word bicycles shall be used exclusively, noting however, that tricycles and cycles are synonomous with bicycles for the purpose of this specification.

The support stand comprises a tubular standard mounted on a plurality of legs. The standard is adapted to receive an adjustable support capable of a variety of elevated adjustments. Also mounted on the standard is an outwardly extending support on which in turn is mounted a pivoted arm, sometimes referred to as an idler arm. The other end of the idler arm is pivotally connected to a linking-rod assembly which in turn is pivotally mounted on a pivotally operated treadle. Also mounted on the idler arm at the pivot point of the idler arm and the linking-rod is a pressure arm. Also mounted on the treadle is a pivotally mounted yoke and shaft assembly, the shaft passing snugly through a passageway located on a friction lock which is pivotally mounted on the standard. Both the treadle and the friction lock are biased in an upward direction. In the operation of the invention, a bicycle frame is placed on the two supports noted above. The treadle is depressed which moves the pressure arm in a direction which causes pressure to be applied on the bicycle frame such that the bicycle frame is held against the adjustable support and the outwardly extending support. Depressing the treadle also causes the yoke and shaft assembly to move downward while simultaneously, the friction lock, through which the shaft passes, is continuously urged upward by the biasing force. Upon depressing the treadle as far as it will proceed, the passageway in the friction lock will be in a position such that the sides of the passageway and the sides of the shaft are not parallel with respect to each other, therefore friction forces (binding) occur sufficient to hold the pressure arm in place thus permanently retaining the bicycle frame in place. To release, it is only necessary to depress the friction lock which releases the binding, the upward biasing action on the treadle results in the treadle moving upward, thus directing the pressure arm away from the bicycle frame.

BRIEF DESCRIPTION OF THE DRAWINGS

FIG. 1 is a front elevation view of the preferred embodiment.

FIG. 2 is a partial side view of the upper portion of the cycle stand.

FIG. 3 is a top view of the cycle stand.

FIG. 4 is a side elevation view of the cycle stand.

FIG. 5 is an illustration of a bicycle supported by the cycle stand.

DESCRIPTION OF THE PREFERRED EMBODIMENT

Referring now to the drawings, particularly to FIGS. 1 and 4, there is shown a bicycle support stand 10 for supporting a bicycle frame, having a bottom bracket and downtube. The support stand 10, the preferred embodiment of this invention which includes in general terms, a standard 12 mounted on four legs 14, although not necessarily restricted to having any legs, which may or may not be an integral part of the standard 12. The body of the standard 12 is of tubular construction, square in this embodiment, thereby having an inner opening throughout the length thereof, for receiving and containing an adjustable support 16. Although the adjustable support 16 is shown mounted in the opening of the tubular standard 12 it is readily apparent that it could be mounted exterior to the standard 12 without departing from the teaching of this invention. The adjustable support 16 includes a plurality of openings 18 positioned throughout the length thereof and passing through the entire width thereof. The standard 12 includes a keyway 20 which passes through the entire width thereof. The adjustable support 16 may be held at any desired height by aligning a selected one of the holes 18 with the keyway 20 and passing a support key 22 through the aligned openings. Mounted on top of the adjustable support 16 is an arcuate shaped bearing surface 24, although not necessarily restricted to such a shape as it could be square or angular in configuration, which may be lined with a pad 26 made of a soft pliable material such as rubber.

Mounted on the standard 12 is an outwardly and upwardly extending support arm 28 which is fixedly mounted, for best results, on the upper portion of the standard 12. The support arm 28 may be welded on or may be integral to the standard 12. The support arm 28 has pivotally mounted on the outward extremity thereof, at a pivot point 30, a second bearing surface 31, arcuate in shape, although not necessarily restricted to that shape. Also pivotally mounted on the support arm 28, preferably at pivot point 30, is a forked wheel guide and an idler arm 32. The idler arm 32 has attached thereto on the end opposite to the pivot point 30, a pressure arm 34 which is in the form of an outwardly extending shaft encompassed by a soft material 62. The pressure arm 34 attached to the idler arm 32 also functions as the pivot point for one end of a linking rod 36 which is connected to the idler arm 32. The other end of the linking rod 36 is attached to a treadle 38 at pivot point 40. One end of the treadle 38 is pivotally mounted at a pivot point 42 located on one of the supporting legs 14. Pivotally mounted on the treadle 38 at a pivot 44 is a yoke 46 to which is attached a shaft 48. A friction lock 50, which may be a flat rod or arm is pivotally mounted on the standard 12 at pivot point 52. Located on the friction lock 50 is an opening for receiving the shaft 48. A high tension spring 54 is connected to the friction lock 50 and to the standard 12. The spring 54 serves to biase the friction lock 50 in a first direction (upwardly towards the standard 12). The treadle 38 is also biased by a high tension spring 56 in a first direction (upwardly towards the standard 12). The reasons for the biasing springs will soon be apparent. Referring for a brief moment to FIG. 3, which illustrates in more detail the connections made at the pivot point 30. A compression spring 58 is placed on a shaft mounted on the idler arm 32, the shaft serving as the pivot point 30. The spring 58 functions to apply pressure on the pivotally mounted bearing surface 31 and the forked wheel guide 33 thus retaining them in any position to which they are set. A locking means 60, which may be a bolt or spring washer holds the entire assembly on the outwardly extending support 28 together.

In operation, the bicycle is positioned on the bicycle support 10, such as shown in FIG. 4, with the bottom bracket of the bicycle resting on the first bearing surface 24 and the downtube of the bicycle resting on the pivotally mounted second bearing surface 31. Since the bearing surface 31 is pivotally mounted, it easily adjusts to the angle of the downtube of any bicycle.

Locking the bicycle on the support stand 10 is accomplished by depressing the treadle 38 in a second direction (downwardly in this instance) until its motion is inhibited by the pressure arm 34 forcing the bicycle frame against the bearing surfaces 24 and 31. It is noted that the shaft 48 also follows the treadle 38 in its downward motion and remembering also that the friction lock 50 is biased upward by spring 54, it can be seen how the friction lock is accomplished. The force urging the friction lock 50 to go upward causes the walls of the passageway on the friction lock 50 to be out of alignment with the exterior of the shaft 48. Upon removing pressure from the treadle 38, the upward urging of the shaft 48 caused by the spring biased treadle 38 results in binding occuring in the passageway through which the shaft 48 passes, thus friction locking action occurs which keeps the pressure arm 34 against the bicycle frame, thus retaining the bicycle on the support stand 10. In summary, it can be seen that it is only necessary to position the bicycle on the support stand 10 and to depress the treadle 38 as far as it will go. FIG. 5 illustrates the cycle support stand supporting a bicycle in an upright elevated position.

To release, it is only necessary to depress the friction lock 50 and the treadle 38 will move upward, thus releasing the bicycle because of the upward movement of the pressure arm 34.

If one desired to restrict the lateral movement of a wheel which may be on the bicycle, it is only necessary to raise the forked wheel guide 33 upward such that the front wheel is positioned between the forked wheel guide 33.

What is claimed is:

1. A cycle support stand for retaining a cycle frame, having a bottom bracket and downtube, in an elevated upright position, comprising:
   an adjustable support having a first arcuate bearing surface fixedly mounted thereon for receiving the bottom bracket of a cycle frame and a second arcuate bearing surface pivotally mounted thereon for receiving the downtube of a cycle frame, said adjustable support being further provided with a plurality of spaced passageways transverse to the length thereof;
   a tubularly constructed standard adopted to receive said adjustable support and being further provided with one keyway, whereby said passageways and said keyway are utilized in a manner such that when a selected one of said passageways on said adjustable support and said keyway are in alignment forming one opening, said alignment is retained by the insertion of a key in said opening:
   pressure means for applying pressure on said cycle frame in such a manner that said downtube is firmly held adjacent to said adjustable support and said outwardly extending support whereby the cycle is retained in an elevated upright position; and
   locking means for permanently locking said pressure means, said locking means comprising an arm pivotally mounted on said standard and spring biased in a first direction, said arm in intimate engagement with a shaft pivotally mounted on said treadle, said locking means operating such that when said treadle, is depressed in a second direction a friction lock in a first direction is formed due to the urging of said spring biased arm in a first direction.

2. A support stand according to claim 1 wherein said means for applying pressure comprises a treadle pivotally mounted on said standard and biased in an upward direction, said treadle being in link-rod connection with a pressure member moveably mounted on said standard and operating such that said pressure member is caused to retain said cycle frame on said first and second arcuate bearing surfaces when said treadle is depressed in a second direction.

3. A cycle support stand for retaining a cycle frame having a bottom bracket and downtube in an elevated upright position, comprising:
   an adjustable support;
   a first arcuate bearing surface mounted on said adjustable support for receiving the bottom bracket of a cycle frame;
   a standard including a plurality of outwardly extending legs, said standard adapted to receive said adjustable support;
   an outwardly and upwardly extending support fixedly mounted on the upper end of said standard;
   a second arcuate bearing surface pivotally mounted on said outwardly and upwardly extending support for receiving the downtube of a cycle frame;
   a pressure member moveably mounted on said cycle support stand;
   a treadle in link-rod connection with said pressure member, said treadle being pivotally mounted on said support stand and spring biased in a first direction and operating such that when depressed in a second direction, said pressure member is caused to retain said bicycle frame on said first and second arcuate bearing surfaces;
   a shaft and yoke assembly pivotally mounted on said treadle; and
   a locking member pivotally mounted on said standard and provided with a passageway for receiving said shaft, said locking member being spring biased in a first direction and operating to provide a friction lock for said shaft when said treadle is depressed in a second direction due to the urging of said spring biased locking member in a first direction.

4. A support according to claim 3 wherein said pressure member is pivotally mounted on said outwardly and upwardly extending support and said treadle being pivotally mounted on a selected one of said outwardly extending legs.

5. A support according to claim 4 further including a forked member pivotally mounted on said outwardly and upwardly extending support for engaging a front wheel of a bicycle thereby preventing any lateral movement thereof.

* * * * *